United States Patent [19]

Bullock et al.

[11] Patent Number: 4,755,808

[45] Date of Patent: Jul. 5, 1988

[54] AUTOMATIC CAPTURE OF POINTING DEVICE ACTIONS IN A KEYSTROKE PROGRAM

[75] Inventors: Garland R. Bullock, Austin; Allen W. Heath, Cedar Park; Ronald K. Sheppard, Austin, all of Tex.

[73] Assignee: International Business Machines Corporation, Armonk, N.Y.

[21] Appl. No.: 873,758

[22] Filed: Jun. 13, 1986

[51] Int. Cl.$^4$ .................................................. G09G 1/00
[52] U.S. Cl. ...................................... 340/709; 340/706; 340/711; 178/18
[58] Field of Search ................ 340/706, 707, 708, 709, 340/710, 711, 712, 724; 178/18

[56] References Cited

U.S. PATENT DOCUMENTS

| | | |
|---|---|---|
| 4,370,645 | 1/1983 | Cason et al. |
| 4,464,652 | 8/1984 | Lapson et al. ........................ 340/710 |
| 4,672,683 | 6/1987 | Matsueda ............................. 340/707 |
| 4,675,665 | 6/1987 | Halliwell .............................. 340/707 |
| 4,677,258 | 6/1987 | Kawashima et al. ................ 340/710 |

FOREIGN PATENT DOCUMENTS 59-116841 7/1984 Japan .
2161755 1/1986 United Kingdom .

OTHER PUBLICATIONS

Research Disclosure 243019, (Anonymous Publication), "Display Screen Touch Device" (Jul. 10, 1984).
Research Disclosure 256036, (Anonymous Publication), "Run-Time Configuration of Device Dependent Screens" (Aug. 10, 1985).

Primary Examiner—Gerald L. Brigance
Attorney, Agent, or Firm—Douglas H. Lefeve

[57] ABSTRACT

In a data processing system including a keyboard a visual display device, and a pointing input device, such as a mouse, pointing input device events, as well as keyboard events, can be directly stored relative to a keystroke program by defining and storing relative to each menu, command bar, or subdivision thereof, a table of zones capable of being pointed to by the pointing input device. The pointing input device position is then compared to the coordinates of the zones and when a match of the zone coordinates and pointing input device position occurs the stored data table is further utilized to determine valid pointing input device events. The presence of the pointing input device pointer in appropriate zones, along with appropriate pointing input device actions, are the events stored relative to a keystroke program, rather than a conversion of the pointing input device actions into keystrokes by keyboard emulation.

13 Claims, 8 Drawing Sheets

AUTOMATIC CAPTURE OF POINTING DEVICE ACTIONS IN A KEYSTROKE PROGRAM

DESCRIPTION

1. Technical Field

This invention relates to data processing systems in general and more particularly to a data processing system which includes a pointer controlled by a pointing device and a program enabling the capture of keystrokes.

2. Background Art

With computer systems employing keyboards and visual display devices, it has been a common practice to employ the cursor control keys of the keyboard to "point to" an operation, function, command, or option which is desired to be selected. Selection of the chosen operation is thereafter accomplished in most instances by a depression of a key, such as an "Enter" key.

With such computer systems, in addition to the cursor motion keys there exists a class of pointing devices which let one move a pointer on the visual display device in a rapid, direct manner, rather than by incremental movements. One example of this class of devices has come to be commonly referred to as a "mouse". These devices have come to be used to allow an operator to rapidly point to such an operation, function, command, or option which is desired to be selected. Selection of the operation is then accomplished by the clicking of a button associated with the pointing device after the named operation is pointed to.

For the purposes of simplifying the remaining description of this invention, the mouse will be used as the example of the above described class of pointing devices, although those skilled in the art will recognize that this invention is also applicable to capturing events generated by other pointing devices such as, but not limited to, tablets, joysticks, and light pens.

Computer programs have been available which allow the use of both the cursor control keys and also a mouse in the selection of such displayed commands, functions, operations, or options. In certain cases the operation of both of the motion control facilities (cursor motion keys and a mouse) have been allowed to be active simultaneously.

Some computer programs have allowed the capture of a sequence of keystrokes to be played back after the capture operation has ended. Most of these programs have automatically terminated the capture of any keystrokes immediately upon the detection of any mouse activity. Other programs have ignored any mouse actions detected during the capture of keystrokes and have continued with the capture process. Of these two prior art techniques, the first has yielded predictable, but annoying results, since the capture process simply comes to an end at the first detection of a mouse action. The second technique of ignoring mouse actions can yield very unpredictable and, therefore, totally unacceptable results.

It has been possible with some prior computer programs to capture a mouse action by effectively converting a mouse movement to a succession of cursor motion keystrokes and then saving the mouse action as such a sequence of keyboard actions. However, since a a great many keystrokes may be required to represent a mouse action, this solution would be very inefficient and, thereby, greatly impact the system performance.

Therefore, the need has existed for a way to directly save mouse actions along with keystrokes, without the performance impact of converting mouse actions into keystrokes.

SUMMARY OF THE INVENTION

Accordingly, with the present invention a table of mouse zones is defined and stored relative to each menu, menu bar, or subdivision thereof which is capable of being pointed to by the mouse and having the mouse select an option therefrom. The mouse position is then compared to the coordinates of the zones. When a match of zone coordinates and mouse position occurs, the stored table data is further utilized to determine valid mouse actions. The presence of the mouse pointer in appropriate zones, along with appropriate mouse actions, are the events stored relative to a keystroke program, rather than a conversion of the mouse actions into keystrokes.

The foregoing and other objects, features, extensions, and advantages of the invention will be apparent from the following more particular description of preferred embodiments of the invention as illustrated in the accompanying drawings.

BEST MODE FOR CARRYING OUT THE INVENTION

Figure 1:
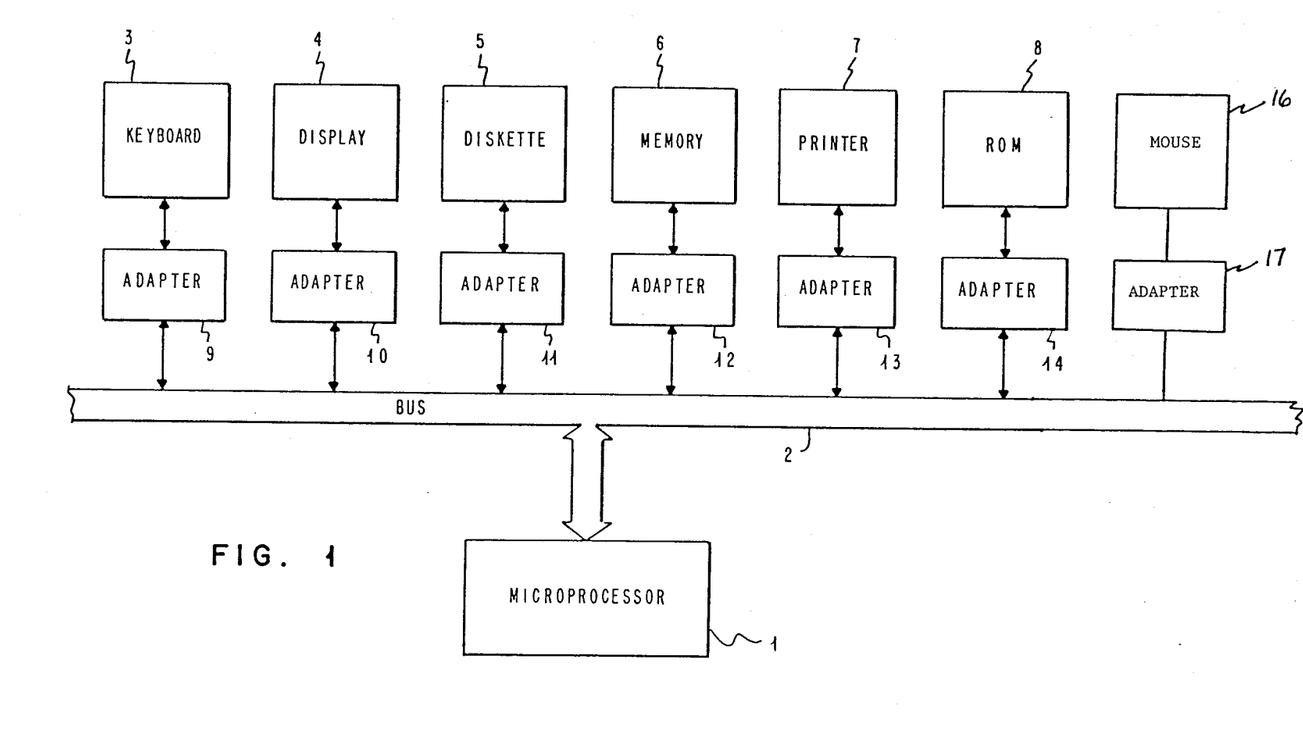
FIG. 1 is a block diagram of a data processing system which includes a stored program for performing the function of this invention in conjunction with the data processing system.

Beginning with reference to the block diagram of FIG. 1, a typical personal computer architecture is shown, such as the configuration used in the IBM Personal Computer. The focal point of this architecture comprises a microprocessor 1 which may, for example, be an Intel 8088 or similar microprocessor. The microprocessor 1 is connected to a bus 2 which comprises a set of data lines, a set of address lines and a set of control lines. A plurality of I/O devices or memory or storage devices 3–8 and 16 are connected to the bus 2 through separate adapters 9–14 and 17, respectively. For example, the display 4 may be the IBM Personal Computer Color Display and the adapter 10 may, accordingly, be the IBM Color/Graphics Adapter. The other devices 3 and 5–8 and adapters 9 and 11–14 are either included as part of an IBM Personal Computer or are available as plug-in options from the IBM Corporation. The Mouse 16 and adapter 17 are available from the Microsoft Corporation as the Microsoft Mouse, bus version. The random access memory (RAM) 6 and the read-only memory (ROM) 8 and their corresponding adapters 12 and 14 are included as standard equipment in the IBM Personal Computer, although additional random access memory to supplement memory 6 may be added via a plug-in memory expansion option.

Within the read-only memory 8 are stored a plurality of instructions, known as the basic input/output operating system, or BIOS, for execution by the microprocessor 1. The BIOS controls the fundamental operations of the computer. An operating system such as the IBM Personal Computer Series Disk Operating System by Microsoft Corporation, or DOS, most commonly used with the IBM Personal Computer family, is loaded into the memory 6 and runs in conjunction with the BIOS stored in the ROM 8. It will be understood by those skilled in the art that the personal computer system could be configured so that parts or all of the BIOS are stored in the memory 6 rather than in the ROM 8 so as to allow modifications to the basic system operations by changes made to the BIOS program, which would then be readily loadable into the random access memory 6.

An application program such as the IBM Display-Write 3 word processing program may also be loaded into the memory 6 to provide instructions to the microprocessor 1 to enable a comprehensive set of word processing tasks, including the creation and revision of text documents, to be performed by the personal computer system shown in FIG. 1. An application program loaded into the memory 6 is said to run in conjunction with the disk operating system previously loaded into the memory 6.

Figure 2:
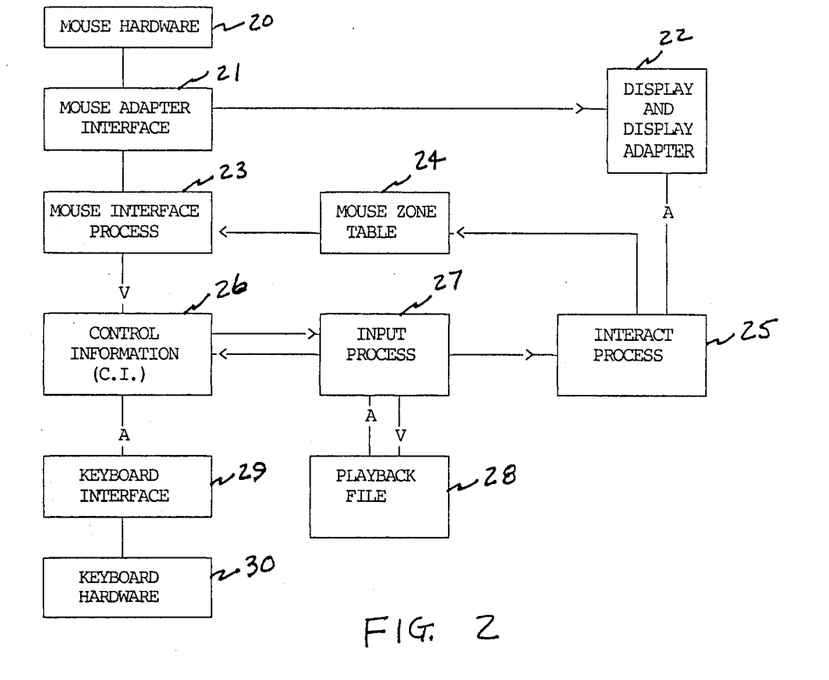
FIG. 2 is an overview diagram of the data processing system process interaction which occurs when utilizing this invention.

Referring now to FIG. 2, an overview diagram of the data processing system process interaction which occurs when utilizing this invention is shown. The mouse hardware 20 may, for example, comprise the Microsoft Mouse. This mouse is available in either a serial version, which plugs into an Asynchronous Communications Adapter available for the IBM Personal Computer, or in a bus version which includes an adapter card which plugs into an accessory slot in the IBM Personal Computer. The mouse adapter interface 21 may, for example, comprise the adapter card from the bus version of the Microsoft Mouse described above. This adapter card and the program stored on the diskette, which is a part of the Microsoft Mouse product, make up the mouse adapter interface 21 and are able, for example, to send information to the system to enable the display of a pointer relative to the mouse position on the display and display adapter 22. The display and display adapter 22 may comprise the display 4 and adapter 10 described above relative to the IBM Personal Computer.

Information from the mouse adapter interface 21 is supplied to the Mouse Interface process 23. This mouse Interface process 23 is described in detail relative to FIG. 6 herein. The mouse Interface process 23 receives information from the mouse zone table 24. The details of the mouse zone table 24 are described relative to FIG. 5. Data relative to information such as a menu or menu bar, for example, is stored in the mouse zone table 24 by the Interact process 25, which process is described in detail relative to FIG. 3. The Interact process 25 also processes actions generated by the mouse in accordance with a user's operation thereof.

Figure 7:
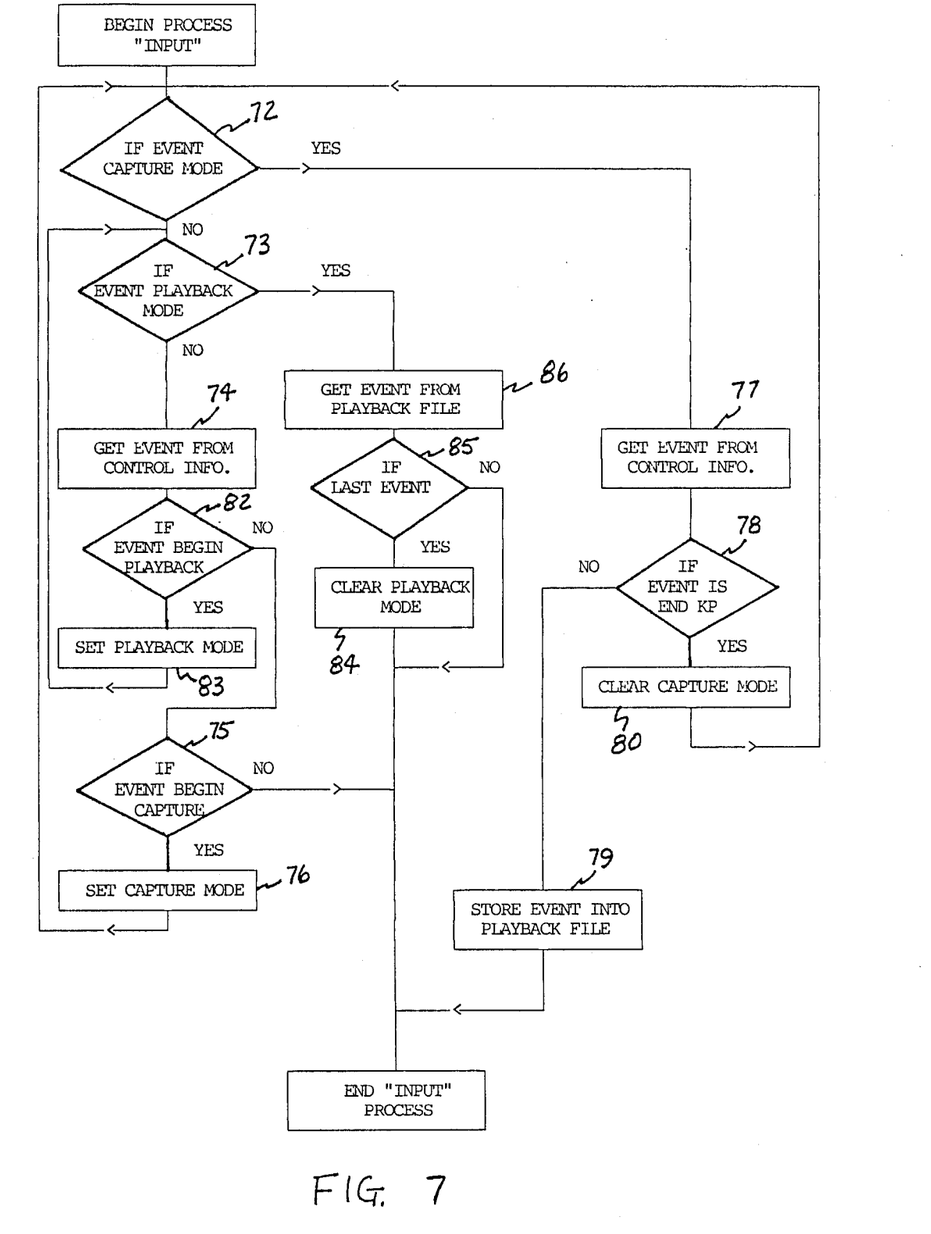
FIG. 7 is a flow diagram of the Input process of FIG. 2.

The keyboard hardware 30 and keyboard interface 29 may, for example, include the keyboard 3 and adapter 9 of FIG. 1. Both the mouse 20 and the keyboard 30 in FIG. 2 are capable of generating event data which is ultimately stored in a portion 26 of the data processing system random access memory as Control Information, hereinafter referred to as the CI. The input process 27, described in detail relative to FIG. 7, is capable of processing both mouse events and keyboard events such that either of these types of events or a sequence including both types of these events may be stored for playback in a playback file 28 portion of the system random access memory. The contents of the playback file 28 may be written to an off-line storage device such as a magnetic storage diskette or hard file.

Figure 4:
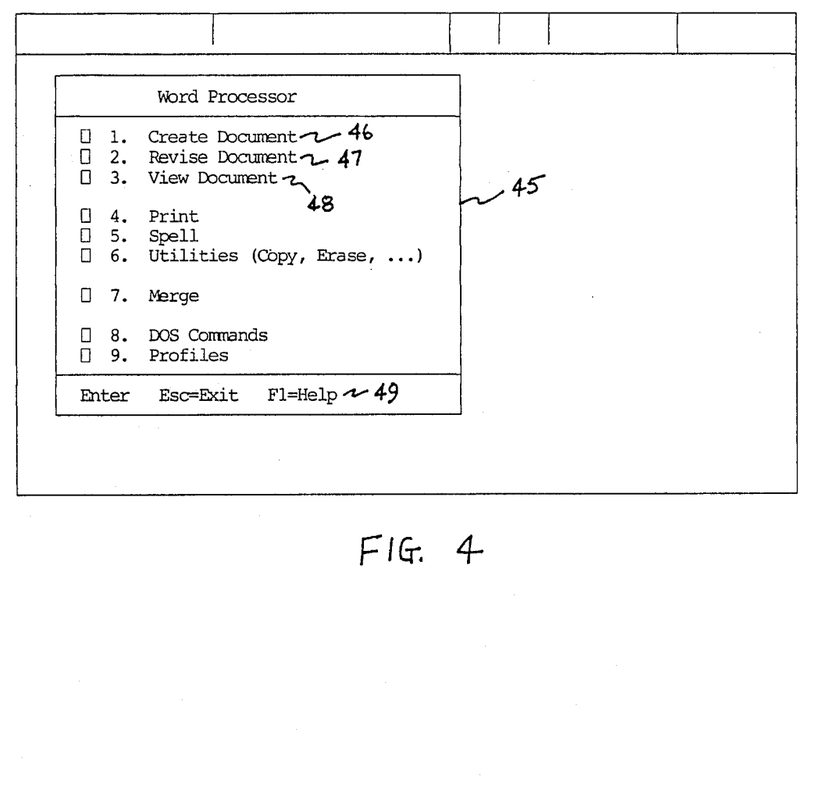
FIG. 4 shows a typical word processing system main menu which depicts operating modes which may be selected by mouse events capable of being stored according to this invention.

Refer now to FIG. 4 which shows a typical word processing system main menu 45. The Create Document, Revise Document, and View Document operating modes 46-48 represent three of the modes or functions in the main menu 45. According to the embodiment of the word processing system, if a user desired to revise a document, the Revise Document mode might be selected by the keying of a 2 or an "R" with the aid of the system keyboard. With the additional aid of a mouse, the system user might move the mouse until the pointer associated therewith pointed near one of the characters of the Revise Document mode. When the mouse pointer is so positioned, the Revise Document mode may be displayed in reverse video and the clicking of a button associated with the mouse may select the Revise Document mode.

Word processing programs such as the IBM Display-Write 3 program allow the operator to capture and store a sequence of many keystrokes so that the sequence can be played back by the depression of one or two keys to activate the playback of the sequence. This eliminates the need to re-key an often used, but tedious sequence of keystrokes. This invention provides the ability to intermix mouse events, such as the one just described relative to the selection of the Revise Document mode, with keystroke events in a captured sequence of keystrokes known to DisplayWrite 3 users as a keystroke program.

Those skilled in the art will realize that while it may have been possible with prior art computer programs to capture a mouse action by effectively converting a mouse event into the equivalent of a succession of keystrokes and then save the mouse action as such a sequence of keyboard actions, since it may require a great number of keystrokes to represent such a mouse action, this solution is very inefficient and, therefore, greatly impacts the system performance. Utilizing the principles of this invention, in contrast with the prior art technique, mouse events are stored in a more direct manner than by conversion to keystroke actions, thereby substantially enhancing the performance of keystroke programs.

The direct storage of mouse actions of this invention is accomplished with the aid of a mouse zone table 24 which resides in a portion of the random access memory of the system of FIG. 1. When a display object such as the menu 45 of FIG. 4 is sent to the display device, the mouse zone table is loaded with information relative to the various fields which comprise the displayed menu. For example, a display area boundary definition of the area on the display screen occupied by each of the displayed fields of the menu 45 are loaded into the mouse zone table from data permanently associated with the menu 45.

Figure 5:
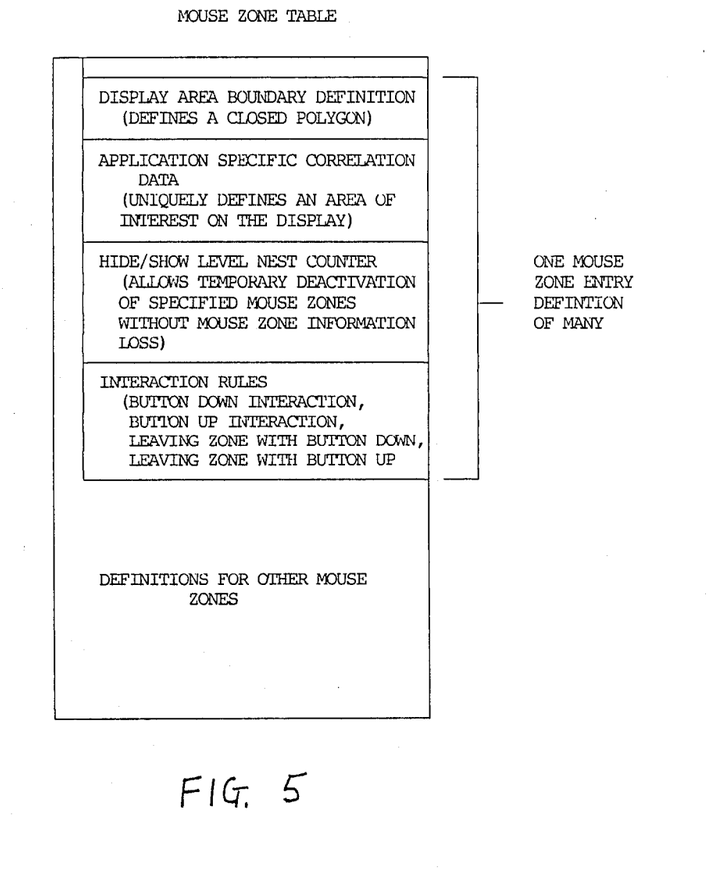
FIG. 5 shows a typical mouse zone table entry.

Assume now that the one mouse zone entry definition shown in detail in FIG. 5 relates to the Revise Document mode 47 shown in the menu 45. Thus, the Display Area Boundary Definition portion of this entry into the mouse zone table includes the coordinates on the display screen in which the digit "2." and words "Revise Document" reside on the display screen. Another type of data stored relative to each field of menu 45 is called Application Specific Correlation Data which may, for example, provide an identifier to the application program of the menu field selected. Additionally, each field on the menu 45 includes a Hide/Show Level Counter, the function of which is to allow temporary deactivation of specified fields within the menu without loss of mouse zone information about those fields. This is typically utilized with generalized menus having certain functions or modes displayed which are non-accessible or non-selectable during certain type of system operation or when another display panel is temporarily placed on the screen of the display. Finally, each mouse zone entry includes a set of interaction rules relative to each field. The interaction rules define valid and invalid mouse actions relative to the mouse zones and are determinative of which mouse actions constitute recognized system events for each zone.

Figure 3:
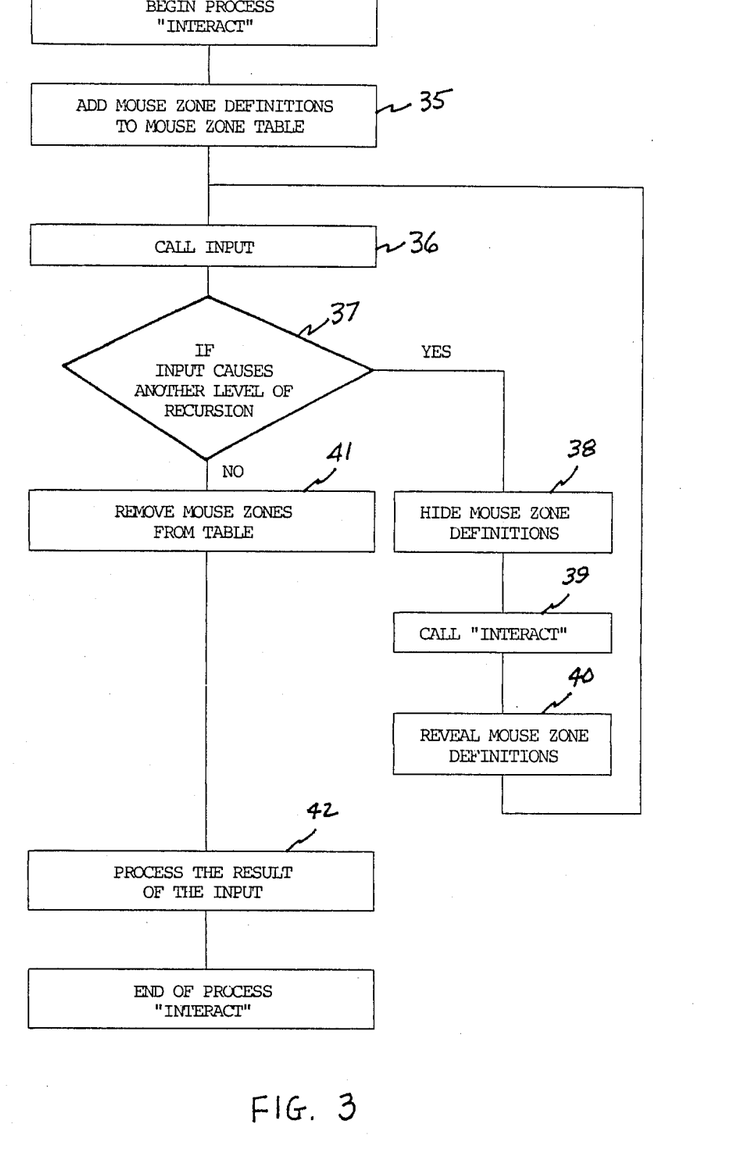
FIG. 3 is a flow diagram of the Interact process of FIG. 2.

Reference is now made to the flow diagram of FIG. 3 for a description of the Interact process 25. This process functions to (1) cause a stored menu panel to be displayed, (2) load the mouse zone table data permanently associated with that menu into the mouse zone table, and (3) ask for and process a user input of a keyboard or mouse event. Within this process it may, additionally, be necessary to display another menu while the first menu continues to be displayed and accordingly, to load another mouse zone table describing that menu and process a user keyboard or mouse event related to that menu.

In FIG. 3, at block 35 the mouse zone definitions permanently associated with the menu panel to be displayed are loaded into the mouse zone table. At block 36 the Input process is called which is shown in detail in the flow diagram of FIG. 7.

Accordingly, referring now to FIG. 7, assume that all decisions therein are initially reset to a "No" state. The process begins at block 72 wherein a test is made to determine if the process is presently in the Event Capture Mode for capturing a series of keyboard or mouse events to be stored in the playback file 28 of FIG. 2. Assuming the system is not in the Event Capture Mode, the operation proceeds to block 73 wherein a test is made to determine if the operation is presently in the Event Playback Mode for playing back a series of events stored in the playback file 28. Assuming that it is not, the information relative to an event is obtained from the control information stored at block 26, FIG. 2. This event information may, for example, relate to a key which was just struck on the keyboard, the movement of the mouse, or the depression or release of a mouse button. The information obtained at block 74 is examined at block 82 to determine if the event is a command to playback a stored series of events. If not, the event data is examined at block 75 to determine if the event relates to a command to begin capturing the immediately succeeding series of events. If it is not, the Input process is ended.

Assume now at block 75 that the event information commands the capture of one or more succeeding events. In this case, at block 76 the capture mode is set and the operation loops back to block 72. Since the Event Capture Mode is set, the operation proceeds from block 72 to block 77 to get the next event from the control information for capture. At block 78 this next event is tested to determine if the event is an End Capture event. If not, at block 79 the event is stored in the playback file 28. Typically, once the Capture mode is set a succession of events are processed by blocks 72, 77, 78, and 79.

Eventually an event will be detected at block 78 which commands an end to the Capture process. In this case the operation proceeds to block 80 which clears the Capture mode.

As succeeding events are then processed by block 72-75 and 82, a Begin Playback event is detected at block 82. In this case, at block 83 the Playback mode is set and the operation proceeds to block 73 wherein it is detected that the playback mode is currently active. The operation then proceeds to block 86 wherein the first event to be played back is obtained from the playback file 28, FIG. 2. At block 85 it is tested to determine if it is the last event to be played back. If not, the operation jumps to the end of this process for repetition relative to the next event in the playback file. When the last event is obtained from the playback file as detected at block 85, the operation proceeds to block 84 to reset the Playback mode of operation.

The following programming design language listing is another form of the description of the above Input process. This listing parallels the operation described above for FIG. 7.

---

BEGIN Procedure INPUT returns EVENT;
SET SWITCH Got_Event OFF;
UNTIL SWITCH Got_Event is ON DO
    IF SWITCH Event_Capture is ON THEN
        GET EVENT from Control Information;
        IF EVENT is END Event_Capture THEN
            Set SWITCH Event_Capture OFF;
        ELSE;
            STORE EVENT into Playback file;
            SET SWITCH Got_Event ON;
        ENDIF;
    ELSE
        IF SWITCH Event_Playback is ON THEN
            GET EVENT from Playback file;
            SET SWITCH Got_Event ON;
        ELSE;
            GET EVENT from Control Information;
            IF EVENT is Begin_Playback THEN
                Set SWITCH Event_Playback ON;
            ELSE;
                IF EVENT is Begin_Capture THEN
                    Set SWITCH Event_Capture ON;
                ELSE;
                    SET SWITCH Got_Event ON;
                ENDIF;
            ENDIF;
        ENDIF;
ENDDO;
END Procedure INPUT return EVENT;

---

Figure 6:
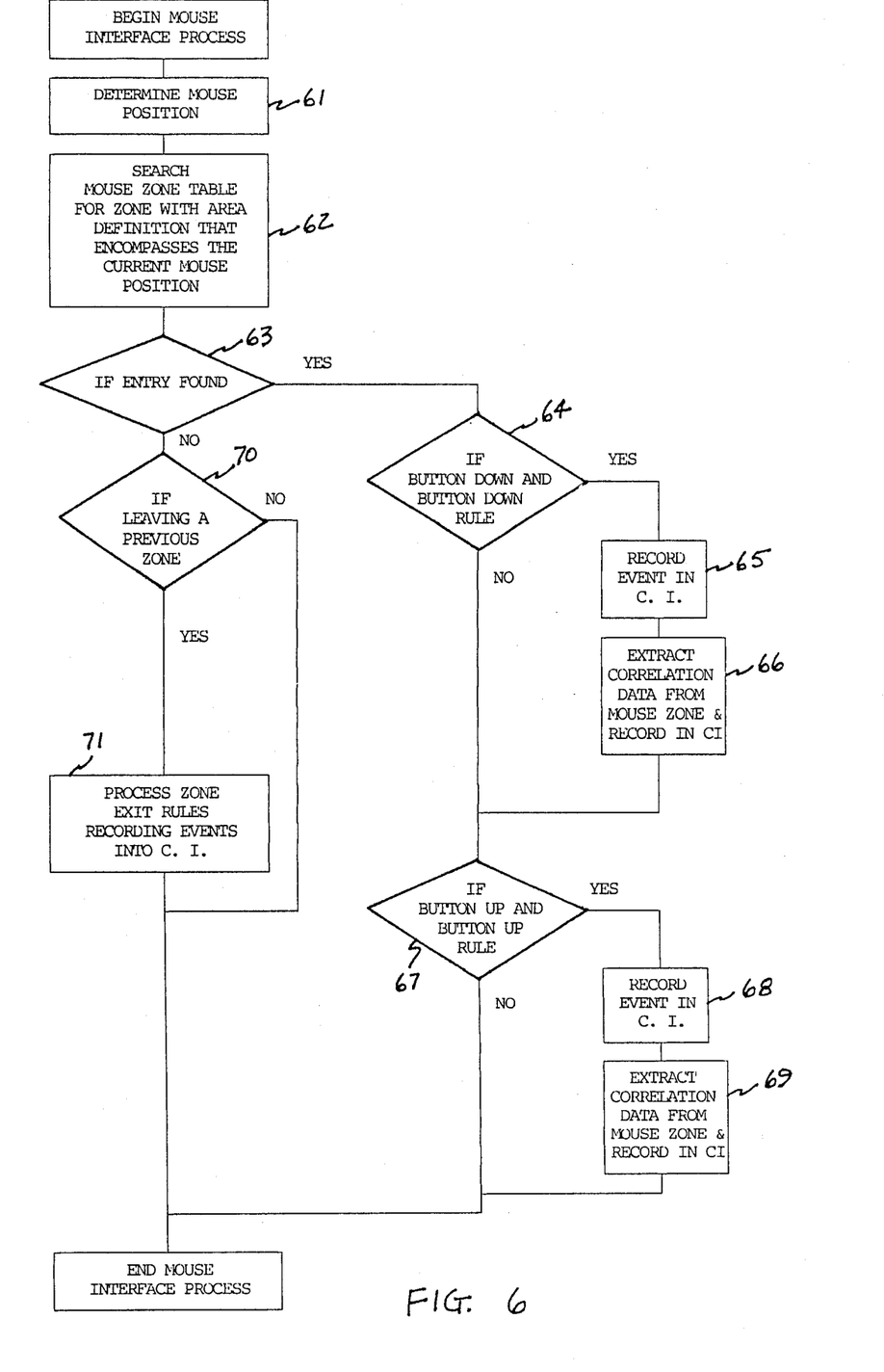
FIG. 6 is a flow diagram of the Mouse Interface process of FIG. 2.

The previous discussion relative to FIG. 7 described the capture and playback of both mouse and keyboard events. While the capture of keyboard events and mouse operations which are directly translated into keyboard events is well known to those of skill in the art, this invention is unique in its storage of mouse events without keyboard emulation, such as by conversion to equivalent keystroke events. Referring to FIG. 6 for the details of this mouse event storage process, a flow diagram of the Mouse Interface process 23 of FIG. 2 is shown. In response to a mouse event, at block 61 the mouse position is determined. A determination of mouse position can be made from information returned by the Mouse Adapter Interface 21 which, as described above, is available in the form of an adapter and program from the Microsoft Corporation which accompanies the Microsoft Mouse. At block 62 the mouse zone table 24 of FIG. 2 (which was loaded by the Interact process 25 of FIG. 2 which, in turn, is shown and described in detail relative to FIG. 3) is searched for a zone with an area definition that encompasses the current mouse position.

In block 63, if such an entry is found in the mouse zone table the mouse is currently pointing to an area such as one of the fields described above relative to the menu 45. The operation then proceeds to block 64 to determine if the mouse button is down and if there is a rule associated with this field of the menu relating to the mouse button's being in a down position. If there is such a rule the operation proceeds to block 65 wherein the event is recorded in the control information (block 26, FIG. 2) and at block 66 application specific correlation data is extracted for use by the application program, such as the word processing program in this example. Similarly, if the mouse button is up and a rule exists for an up position of the mouse button, at block 67 the operation proceeds through blocks 68 and 69 to record this event in the control information 26 and extract this data at block for the use by the application program.

Assume now at block 63 that the mouse position was not found to match an entry in the mouse zone table. The operation the proceeds to block 70 wherein a test is made, based on a previous answer to the test at block 63, to determine if the mouse pointer is leaving a previous zone. If so, at block 71 certain zone exit rules may be processed in a manner such as that described above relative to blocks 64–69 using the appropriate exit rules, and the event of exiting the zone may be advantageously recorded into the control information portion 26 of the system random access memory. This is usually desirable in situations in which it is necessary to later process something relative to the last zone in which the mouse was present before the mouse enters a new zone, an example of which may be the unhighlighting of a menu selectable field as the mouse pointer leaves that field.

The following programming design language listing is another form of the description of the above Mouse Interface Process. This listing parallels the operation described above for FIG. 6.

```
BEGIN PROCESS Mouse_Interface;
FETCH mouse position data and button status from mouse
adapter interface;
Begin SEARCH of Mouse Zone Table LOOKING for a Display
Area Boundary Definition that encompasses the current
mouse position
EXITIF mouse position is within an active mouse zone
entry DO
    IF Button_Status is button down and Interac-
    tion_Rules want button down event THEN
        RECORD button down event into Control
        Information;
        EXTRACT Application_Specific_Correlation
        data from current Mouse Zone entry and
        RECORD event into Control Information;
    ENDIF;
    IF Button_Status is button up and Interac-
    tion_Rules want button up event THEN
        RECORD button up event into Control Informa-
        tion;
        EXTRACT Application_Specific_Correlation
        data from current Mouse Zone entry and
        RECORD event into Control Information;
    ENDIF;
ELSE (search was unsuccessful)
    IF device was in a previous zone THEN
        PROCESS leaving mouse zone with button down
        exit rule;
        PROCESS leaving mouse zone with button up
        exit rule;
    ENDIF;
END SEARCH;
END Process Mouse_Interface;
```

Figure 8:
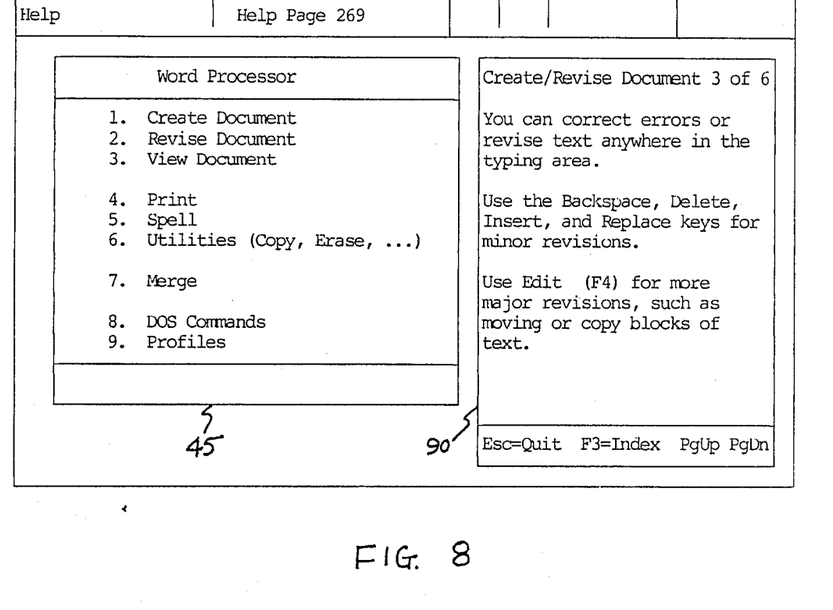
FIG. 8 shows a word processing system main menu as in FIG. 4 with a "Help" menu activated following the display of the main menu.

Refer now to FIG. 8 which shows a word processing system main menu 45 as shown in FIG. 4 with a "Help" menu 90 which is activated following the display of the main menu. Such a "Help" menu is displayed in accordance with the selection of the "Help" mode 49 shown in FIG. 4. When the "Help" mode is selected and the "Help" panel 90 is displayed in the right-hand portion of FIG. 8, this "Help" panel 90 is now the active panel on the display screen and the one panel with which the mouse may interact.

Accordingly, referring back to FIG. 3, each input event at block 36 causes the operation to proceed to block 37 for a test to determine if this input causes another level or recursion. In the case of the selection of the "Help" mode 49, FIG. 4., to produce the "Help" panel 90 of FIG. 8, the test at block 37 determines that another level of recursion has been caused and the operation proceeds to block 38. At this point the present mouse zone definitions are hidden as described previously relative to the mouse zone table shown in FIG. 5. That is, specified mouse zones are temporarily deactivated without the loss of mouse zone information. In this case, the zones deactivated are the zones related to those fields of the main menu 45 shown in FIG. 8. After the mouse zone definitions are hidden at block 38 the operation proceeds to block 39 wherein this Interact process is reentered at block 35. In this case the mouse zone definitions relative to the "Help" panel 90 are added to the mouse zone table and the Input process is called at block 36 to handle further events of the keyboard or mouse relative to the "Help" panel 90 in FIG. 8. When this process ends the operation proceeds to block 40 wherein the hidden mouse zone definitions are again revealed. The timing of this is in accordance with the eventual removal of the "Help" panel.

If, at block 37 the input does not cause another level of recursion, the operation proceeds to block 41 to remove the information relative to the mouse zones from the table 24, FIG. 2. At block 42 the result of the Input event is processed by the application program and the Interact process is at an end.

The following programming design language listing is another form of the description of the above Interact process. This listing parallels the operation described above for FIG. 3.

```
BEGIN Procedure INTERACT (MENU) RETURNS RESULT;
ACTIVATE Mouse Zones for current MENU by ADDING the
mouse zone entries into the Mouse Zone Table;
WHILE EVENT does not complete MENU DO;
    IF EVENT requests another menu interaction THEN
        Save all information relative to displaying
        the current menu;
        HIDE the Mouse Zone entries of the current
        menu;
        Call INTERACT (New_Menu);
```

```
-continued
    REVEAL the Mouse Zone entries of the current
    menu;
  ELSE;
  BEGIN WHILE;
    Call INPUT which returns EVENT;
  END WHILE;
  REMOVE current Mouse Zone entries associated with
  current MENU from the Mouse Zone Table;
  PROCESS menu completion into RESULT;
END Procedure Interact;
```

In summary, mouse events, as well as keyboard events, can be directly captured in a keystroke program by defining and storing relative to each menu, menu bar, or subdivision thereof, a table of zones capable of being pointed to by the mouse. The mouse position is then compared to the coordinates of the zones and when a match of the zone coordinates and mouse position occurs the stored data table is further utilized to determine valid mouse actions. The presence of the mouse pointer in appropriate zones, along with appropriate mouse actions, are the events stored relative to a keystroke program, rather than a conversion of the mouse actions into keystrokes by keyboard emulation.

While the invention has been shown and described with reference to particular embodiments thereof, it will be understood by those skilled in the art that the foregoing and other changes in form and details may be made therein without departing from the spirit and scope of the invention.

We claim:

1. In a method of capturing the actions of a plurality of keys of a keyboard associated with a computer system, for storage in a memory, said system including a visual display for displaying a plurality of objects, the improvement for directly capturing, without keyboard emulation, the actions of a pointing input device along with the actions of said keys, comprising:
   loading a pointing input device zone table with data associated with each object being displayed, said data including a location on said display at which said object is displayed;
   comparing a current pointing input device pointer position with said locations to determine if said pointing input device pointer is pointing to one of said objects; and
   storing a valid pointing input device event in a playback file portion of a random access memory when said current pointer position and one of said locations compare.

2. In the method of claim 1, wherein said data loaded into said pointing input device zone table further comprises a valid pointing input device action for each object displayed.

3. In the method of claim 2, wherein said step of comparing further comprises:
   comparing, when said pointing input device pointer is pointing to one of said objects, a current pointing input device action with said valid pointing input device actions to detect said object's valid pointing input device event.

4. In the method of claim 3, wherein said step of storing further comprises:
   storing a keystroke event generated by said keyboard in said playback file in addition to said valid pointing input device event.

5. In the method of claim 4, wherein said step of storing further comprises:
   recording the contents of said playback file in an off-line storage device.

6. In the method of claim 5, wherein said off-line storage device further comprises a magnetic storage device.

7. In the method of claim 3, wherein said pointing input device comprises a mouse.

8. In the method of claim 3, wherein said pointing input device comprises a tablet.

9. A system for directly capturing, without keyboard emulation, the actions of a plurality of input devices associated with a computer system, for storage of said actions in a memory, said system including a visual display for displaying a plurality of objects, comprising:
   means for loading a pointing input device zone table with data associated with each object being displayed, said data including a location on said display at which said objects are displayed;
   means for sensing the position of and button actions associated with a pointing input device; and
   means connected to said means for loading and said means for sensing for comparing a current pointing input device pointer position with said locations to determine if said pointing input device pointer is pointing to one of said objects; and
   means connected to said means for sensing for storing a valid pointing input device event in a playback file portion of a random access memory when said current pointer position and one of said locations compare.

10. The system of claim 9, wherein said data loaded into said pointing input device zone table further comprises a valid pointing input device action for each object displayed.

11. The system of claim 10, wherein said means for comparing further comprises:
    means for comparing, when said pointing input device pointer is pointing to an object, a current pointing input device action with said valid pointing input device actions to detect said objects valid pointing input device event.

12. In the system of claim 10, wherein said pointing input device comprises a mouse.

13. In the system of claim 10, wherein said pointing input device comprises a tablet.

* * * * *